Patented Dec. 4, 1934

1,983,270

UNITED STATES PATENT OFFICE 1,983,270

PROCESS FOR THE PURIFICATION OF SAND

Theodore Earle, Denver, Colo.

No Drawing. Application January 26, 1931, Serial No. 511,446. Renewed April 10, 1934

5 Claims. (Cl. 252—8)

My invention relates to a process for the purification of sand for glass manufacture, and more especially to such a process in which the sand may be treated in a continuous stream and which will therefore require comparatively little storage capacity and plant size.

Reduction of the iron oxide content of sand to as low as .02% is highly desirable for glass manufacture.

This may be accomplished by my process described in my pending application, Serial No. 502,628, filed December 15th, 1930, in which dilute acid is added to the sand after the grouped grains are separated by rubbing, and the sand is leached and allowed to dry for several days in a pile or a vat or tank. This leaching operation takes time and space, which means considerable storage space must be provided for a large capacity plant and also means that in an emergency the glass plant, being supplied by the sand treating plant, might have to be shut down, even though plenty of fresh but untreated sand were on hand.

The object of this invention, therefore, is to provide a sand purification process which will remove the iron content to the low percentage desired and which requires little storage space and plant size.

A further object is to provide a sand purification process which may operate to feed a glass plant properly treated sand as required, substantially direct from the fresh untreated sand source, or at least in a continuously moving stream from the source to the glass plant.

A further object is to provide a sand purification process which may be run continuously, thereby cutting first cost of the plant as well as the cost of operation of the plant.

A further object is to provide such a sand purification process whereby a smaller amount of stronger dilute acid may be employed with the resulting saving in acid costs.

A further object is to provide such a sand purification process, which, because of all of the above objects, will result in a cleaner and a cheaper sand for the manufacture of glass.

I attain the above objects by providing a process in which the sand in a continuous stream has relatively weak acid added to it, the excess liquid is removed, the moving stream of wet sand is subjected to heat to evaporate the excess water without evaporating the acid, leaving the hot and very strong acid in the sand, washing the stream of sand, dewatering and drying the sand, and passing the dry sand through a separator device of the magnetic, electric, electrostatic, or induction type.

Classifiers, thickeners, conveyors, elevators, mechanical rakes, dryers, dewatering devices, deslimers, magnetic, electric, electrostatic or induction separators, and all such well known commercial devices and systems, may naturally be used in my process, their arrangement, number, and sequence being as desired or required for any individual case and set of conditions. All of this will be well understood by anyone versed in the arts touched upon.

In the operation of my process, the stronger acid naturally attacks the iron content of the sand more vigorously than the usually used weaker acid, and the addition of heat to the stream of sand for the evaporation of the excess water, not only concentrates the acid, but apparently tends to crack apart the grouped individual sand grains which are cemented together and often hold an iron content that otherwise it is difficult or impossible for the acid to reach and dissolve. So, between the action of the heat on the grouped wet sand grains and the action of the hot concentrated acid after the excess water has been evaporated, the results obtained are most satisfactory, the iron oxide content consistently being reduced to as low as .02%.

In some sands, the action of the heated acid produces a discoloration, or darker color in the sand. This may be removed by the addition of a small amount of sodium bicarbonate or other acid neutralizer to the water with which the sand is washed after the first washing which removes most of the concentrated acid. Though this produces no diminution in the iron content of the sand, it does bring back its natural color, which in some cases would be most desirable.

Because it is too costly to use large amounts of strong acids for such low priced ores, as the above, and also because the equipment needed for handling them is expensive where a strong acid is used, my invention does away with these objections by using a small amount of both diluent and acid. Most glass-sands, feldspars, etc. (if they are suitable at all for further cleaning by leaching) carry less than 2% of objectionable impurities and these impurities usually occur as a film on the grains. This film is extremely thin and only a very small amount of acid is needed to attack it. Or, in the case of finely ground barytes, both a film and tiny particles may occur. The acid needed to put these in water soluble form must be spread evenly over each and every grain, but excess strong acid or large amounts of weak acid are not needed. Excess strong acid would only be wasted on final washing and the heat needed to evaporate large amounts of diluent in a weak acid is used, however, it can be spread evenly over every grain and, when the water is evaporated, the grains are covered with a thin film of strong, hot acid. In cleaning some glass-sands, or feldspars, etc. I have found that as low as 4 lbs. of acid per ton of sand or ore can be used, and the combined free water in the ore and the acid need not amount to over 80 lbs. per ton of ore to give an even spreading effect to the acid. The water is used only as a carrier to spread the acid evenly over every grain. Other sands, or ores—if more impurities are contained or if ground finer—may take as high as 100 lbs. of acid and 800 lbs. of water. The limits for the amounts of water and acid for the most economical operation should be somewhere between these two points.

Various ways and different sequences of adding the acid, heat and diluent may be employed but they are only variations of the fundamental thought which is that, by the use of heat, a small amount of acid is brought to a hot, concentrated form on the grains by evaporating the excess water.

Following are some of the variations of the above described basic idea. They all accomplish the same final purpose. In every case there must be enough water in the sand or ore to so dilute the acid that a small amount of the diluted acid will cover a large area of grain surface.

Regardless of when the heat or the acid are added, in any case the evaporation of the excess water in the acid should take place after the mixing of the dilute acid with the sand or ore so that when the evaporation has been completed each particle or grain of the material will be covered by a thin film of the hot concentrated acid.

The first variation may be detailed as follows:

If the ore must be first treated wet in order to grind it or clean it, then this material may be dewatered the necessary amount and then put in a bath of dilute acid. As the material comes from the bath it may again be drained so that any excess weak acid is returned to the system and only the amount of acid needed actually goes with the ore to the heater. Each grain, as it comes from the weak acid bath is, therefore, covered with a solution of weak acid. Or the wetted ore may be sprayed or otherwise mixed with the proper strength and the amount of acid. If the ore is ground dry or is already dried the dilute acid may be added to and mixed with it. The ore is then heated, the excess water evaporated and the strong, hot acid left to act on the impurities.

If a change in color of the treated material would affect its sale, care must be taken not to raise the temperature too high. In some ores, if the temperature of the ore and acid is brought to over 212° F., there may be a darkening of the material by the formation of water insoluble compounds (especially if sulphuric acid is used) and, if kept at higher temperatures for even a few minutes, these insoluble, dark compounds may be formed. All materials do not change color at the same temperatures. Some ores tested need heat of 400° F. to get this effect. A change of color does not affect the salability of all materials, but care should be taken to keep the temperature as low as possible in order not to break down the soluble compounds formed at the lower temperatures, and also not waste heat. If hydrochloric acid is used and the water evaporated an even lower temperature than 212° F. may be used—for a higher heat tends to drive off the chlorine and break down the soluble compounds into insoluble ones. Either sulphuric or hydrochloric acid may be used, depending upon the material being treated and the impurities that it is desired to eliminate. Or any other acid necessary to dissolve the impurities in any special sand may be used as conditions dictate.

Depending on the ore to be treated one of two ways may be used for controlling the action of the acid.

(a) If the natural color of the ore is desired it may be mixed with the acid, heated only to the temperature which does not change its color (this is usually below 250° F.) and then allowed to stand in a bin or other receptacle for from one to 48 hours. While the excess water will have been driven off at this heat, still the acid may not have had time to form the necessary water soluble compounds at the low heat and extra time of contact in a bin is needed.

(b) Heating the mixture of ore and acid to as high as 500° F. has a much quicker action between the acid and the oxides, etc. so that they are, as a rule, put in soluble form without having to rest in a bin and may be washed at once after leaving the heater. A temperature of 500° F. is not always needed. I have treated some ores at 220° F. with excellent results. If the lower temperature (220° F.) is used it may be necessary to keep the ore at somewhere near this heat for some time.

In all of the above methods it may be found necessary for the acid to have a longer contact with the ore as some water soluble compounds are slowly formed. The ore can go from the heater or mixer to a bin where it will stay warm (because of the contained heat or by use of outside heat) and then be given a thorough washing to remove the impurities. In the case of glass-sand, it may be found beneficial to use as a last wash a very weak alkali solution. If the greater part of the acid was not removed in the water washing, the final drying of the sand might form the dark compounds (if the temperature used was too high). The alkali wash prohibits this darkening action. The alkali wash may also give a further cleaning action to some ores by changing the water insoluble compounds to compounds that can be washed away.

When the ore is treated with sulphuric acid (this acid is preferred over hydrochloric) and the change in color is of no moment the temperature used may be raised to such a point that the water soluble compounds are formed more quickly. In this higher heating some of the free acid may be evaporated—for all the acid added is not used in combining with the impurities because many of the grains do not have the film of oxides on them—and these free acid fumes may be recondensed and saved.

In other words, my process is to add from 2 to 100 lbs. (depending upon the amount of impurities to be removed) of acid to the ton of ore together with the necessary amount of water (which may be already in the ore) to give the proper spreading effect to the acid, evaporate, by the addition of heat, the necessary amount of water (which is used solely as a carrier for the acid) and allow the hot, concentrated acid to combine with the impurities, and then wash the ore. The method used for adding the acid to cover each grain depends upon the ore to be treated. The methods used for processing or cleaning the ore, before coming to my leaching process need not be mentioned here. Nor do the methods used after leaving the leach and wash concern my process. These various crushing and cleaning processes are well known and any, all, or none may be used in conjunction with my leaching process.

In the case of treating glass-sand, however, it may be found best practice (in order to keep the sand as coarse as possible) to use, as part of the preliminary cleaning treatment, machinery which will break the cemented sand-grains apart without crushing the individual grains. These machines can be mills using rubber-covered rods or balls, etc. for preliminary separation of the grains and afterwards attrition machines in which one or all surfaces which contact the same are of material (such as rubber) which will rub off what clay, iron-oxide, etc. as is loosely held and still not crush or splinter the grains. The material thus removed is washed off and thrown away. All of such above machines will hereafter be referred to as "Rubbing machines."

Having now described my process, what I claim as new and desire to protect by Letters Patent is as follows:—

1. The process of purifying sand comprising the addition of dilute acid to the sand and heating the sand to evaporate the excess water and leave concentrated acid, and washing the sand.
2. The process of purifying sand comprising the addition of dilute acid to the sand, removal of the excess dilute acid and heating the sand to remove the excess water and concentrate the acid, and washing the sand.
3. The process of purifying sand comprising the addition of dilute acid, removal of the excess dilute acid, heating the sand to remove the excess water and concentrate the acid, washing the sand free of the acid, and dewatering and drying the sand.
4. The process of purifying sand, comprising evaporation of excess water from a mixture of the sand and a weak acid solution to concentrate the weak acid surrounding each particle of the sand so that each particle will be covered by a thin film of concentrated acid, and washing the sand.
5. The process of purifying sand, comprising evaporation of excess water from a mixture of the sand and a weak acid solution to concentrate the weak acid surrounding each particle of the sand so that each particle will be covered by a thin film of concentrated acid, allowing the mixture of sand and acid to move slowly through a bin, and washing the sand.

THEODORE EARLE.